(12) United States Patent
Inuzuka et al.

(10) Patent No.: US 8,002,852 B2
(45) Date of Patent: Aug. 23, 2011

(54) LENS DYEING METHOD AND LENS DYEING APPARATUS

(75) Inventors: Minoru Inuzuka, Hazu-gun (JP); Takahiro Hirai, Toyohashi (JP)

(73) Assignee: Nidek Co., Ltd., Gamagori-shi (JP)

( * ) Notice: Subject to any disclaimer, the term of this patent is extended or adjusted under 35 U.S.C. 154(b) by 345 days.

(21) Appl. No.: 12/149,730

(22) Filed: May 7, 2008

(65) Prior Publication Data

US 2008/0276386 A1     Nov. 13, 2008

(30) Foreign Application Priority Data

May 10, 2007  (JP) .................. 2007-125277

(51) Int. Cl.
*D06P 5/28* (2006.01)

(52) U.S. Cl. ............... 8/507; 8/444; 8/115; 118/641

(58) Field of Classification Search ............ 8/444, 507, 8/115

See application file for complete search history.

(56) References Cited

U.S. PATENT DOCUMENTS 5,560,751 A * 10/1996 Hoshiyama ............... 8/506
6,520,999 B1 * 2/2003 Kamata et al. ............ 8/471

FOREIGN PATENT DOCUMENTS

| EP | 0 610 141 A1 | | 2/1994 |
|---|---|---|---|
| EP | 0 982 432 A2 | | 3/2000 |
| GB | 2253919 A | * | 9/1992 |
| JP | A-2001-59950 | | 3/2001 |

* cited by examiner

*Primary Examiner* — Harold Y Pyon
*Assistant Examiner* — Katie Hammer
(74) *Attorney, Agent, or Firm* — Oliff & Berridge, PLC

(57) ABSTRACT

A method of dyeing a lens, comprises the steps of: (a) applying a dyeing ink containing a sublimable dye onto a base material to produce a dyeing base body; (b) placing the dyeing base body and the lens so that a dye-applied surface of the dyeing base body and a surface of the lens to be dyed face each other in noncontact relation, and heating the dyeing base body under substantially a vacuum condition to sublimate and deposit the applied dye on the lens; and (c) heating the dye deposited surface of the lens by irradiation of infrared rays from one direction to fix the deposited dye on the lens.

2 Claims, 5 Drawing Sheets

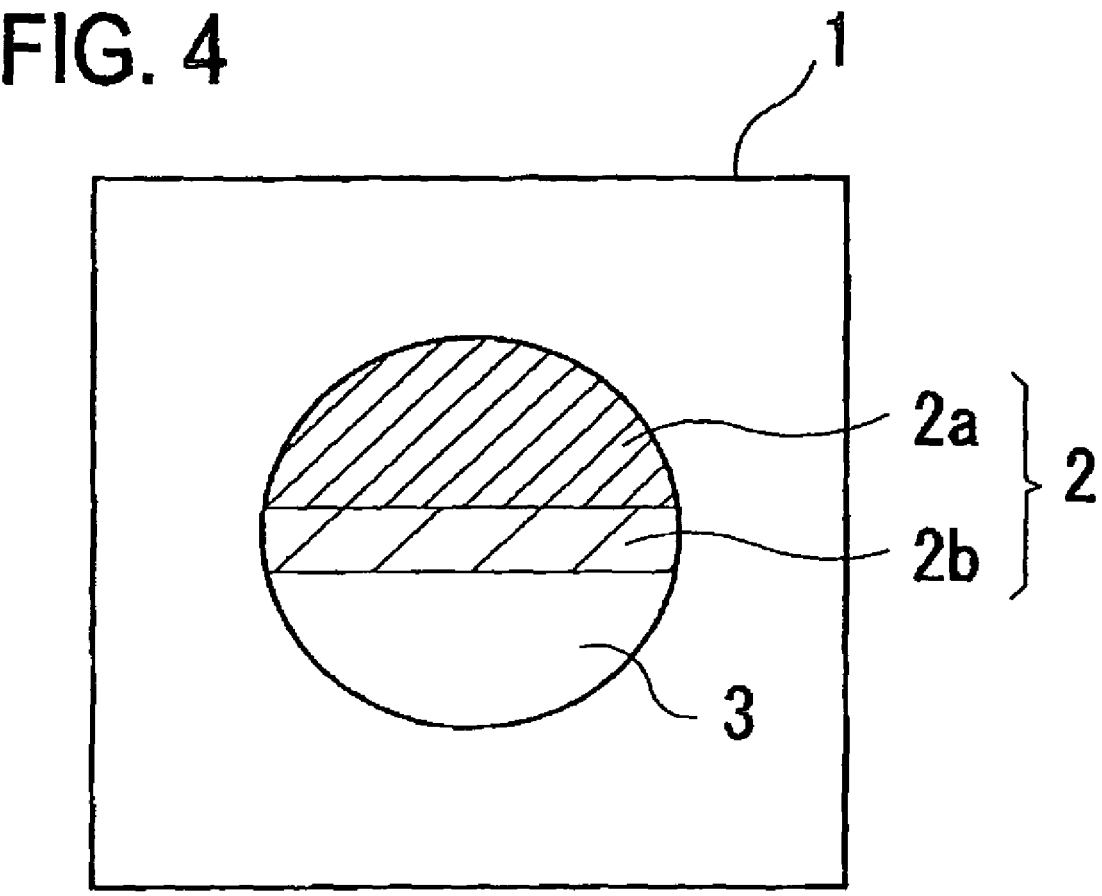

LENS DYEING METHOD AND LENS DYEING APPARATUS

BACKGROUND OF THE INVENTION

1. Field of the Invention

The present invention relates to a lens dyeing method and a lens dyeing apparatus.

2. Description of Related Art

As a method for dyeing plastic (synthetic resin) spectacle lenses, a dyeing method by dipping a lens in a dyeing solution (a dip dyeing method) has been known. This method, which has been used from long ago, has disadvantages such as poor working environments and difficulty in dyeing a lens made of a high refractive material. Therefore, the inventor of the present invention proposed a dyeing method in which dyeing inks containing sublimable dyes are applied onto a base material such as paper by a printer to produce a dyeing base body, the dyeing base body and the lens are placed facing each other in noncontact relation, the dyeing base body is heated under substantially a vacuum condition to deposit the dyes onto the lens, and the lens deposited with the dyes is further heated to fix the dyes on the lens (hereinafter, referred to as a "vapor deposition transfer dyeing method"). See U.S. Pat. No. 6,520, 999B1 (JP2001-59950A), for example.

The above vapor deposition transfer dyeing method could dye a lens made of a high refractive material. However, such a lens made of a high refractive material is liable to discolor or turn yellow due to heating. This is a serious problem particularly when part of a lens made of a high refractive material is not to be dyed, for example, when the lens is to be dyed in gradations.

BRIEF SUMMARY OF THE INVENTION

The present invention has been made in view of the above circumstances and has an object to provide a lens dyeing method and a lens dyeing apparatus, using a vapor deposition transfer dyeing method, capable of appropriately dyeing a lens by preventing the lens from turning yellow due to heating.

Additional objects and advantages of the invention will be set forth in part in the description which follows and in part will be obvious from the description, or may be learned by practice of the invention. The objects and advantages of the invention may be realized and attained by means of the instrumentalities and combinations particularly pointed out in the appended claims.

To achieve the purpose of the invention, there is provided a method of dyeing a lens, comprising the steps of: (a) applying a dyeing ink containing a sublimable dye onto a base material to produce a dyeing base body; (b) placing the dyeing base body and the lens so that a dye-applied surface of the dyeing base body and a surface of the lens to be dyed face each other in noncontact relation, and heating the dyeing base body under substantially a vacuum condition to sublimate and deposit the applied dye on the lens; and (c) heating the dye deposited surface of the lens by irradiation of infrared rays from one direction to fix the deposited dye on the lens.

According to another aspect, the invention provides a method of dyeing a lens comprising the step of: with respect to a dye deposited surface of the lens having a dye deposited area and a dye non-deposited area, irradiating infrared rays to the dye deposited area to fix the deposited dye on the lens while restraining the irradiation of the infrared rays to the dye non-deposited area.

Further, according to another aspect, the invention provides a lens dyeing apparatus comprises: a heater which irradiates infrared rays from one direction to a dye deposited surface of a lens having a dye deposited area and a dye non-deposited area; and a shielding member placed between the lens and the heater to shield the dye non-deposited area.

BRIEF DESCRIPTION OF THE DRAWINGS

The accompanying drawings, which are incorporated in and constitute a part of this specification illustrate an embodiment of the invention and, together with the description, serve to explain the objects, advantages and principles of the invention.

In the drawings,

FIG. 4 is a view showing an example of a dyeing base body;

DETAILED DESCRIPTION OF THE PREFERRED EMBODIMENTS

A detailed description of a preferred embodiment of the present invention will now be given referring to the accompanying drawings.

Figure 1:
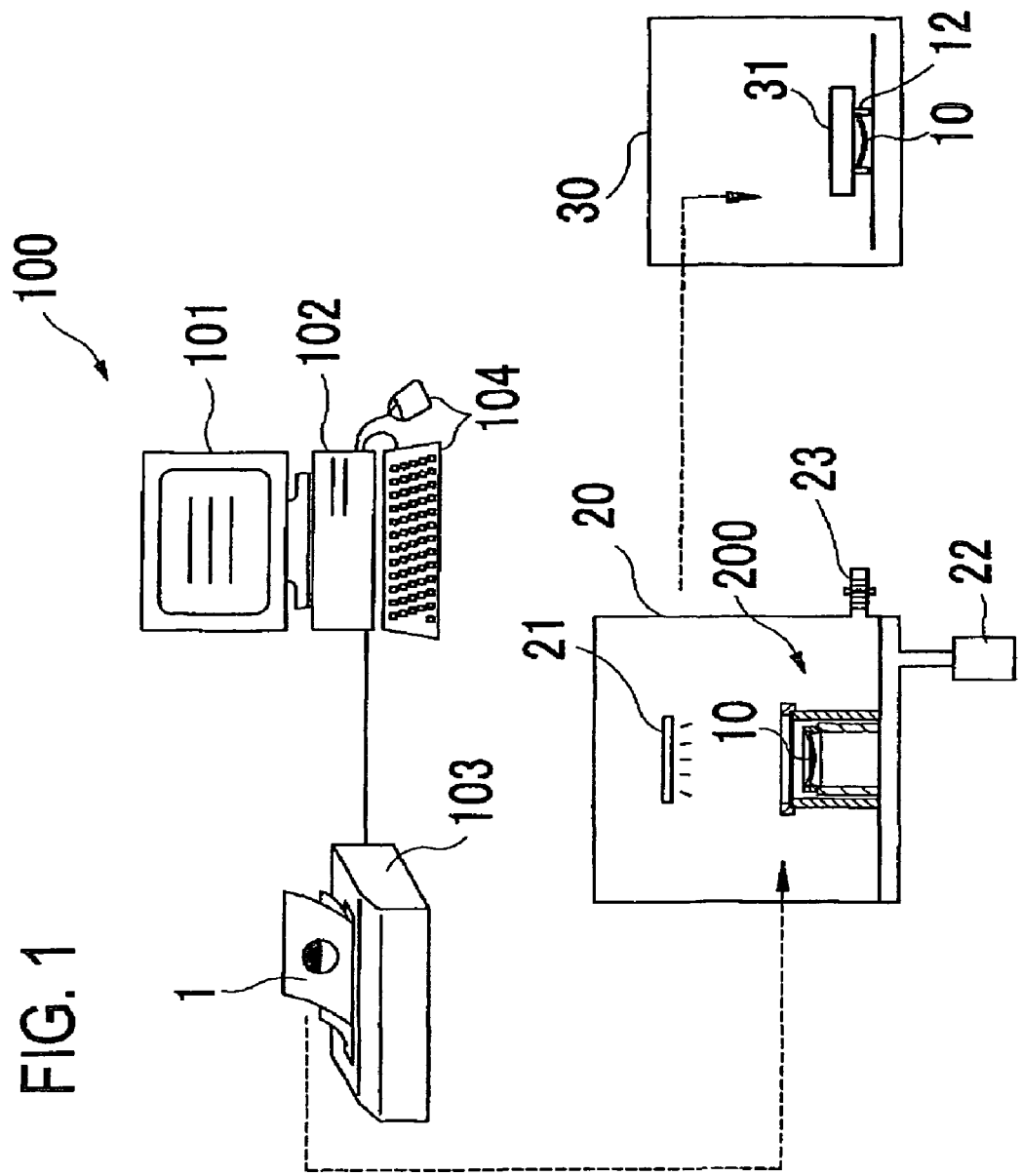
FIG. 1 is a schematic configuration view of a lens dyeing system in an embodiment of the invention.

FIG. 1 is a schematic configuration view of a lens dyeing system in the present embodiment. A dyeing base body producing apparatus 100 includes a monitor (a display unit) 101, a computer (an arithmetic unit) 102, and a printer (a printing unit) 103. An operation unit 104 such as a keyboard, a mouse, and so on also serves as an input unit for entering various information in the computer 102. In this embodiment, an inkjet printer is used as the printer 103.

This computer 102 is provided with an arithmetic control part having a CPU which carries out arithmetic operation and a memory part having a hard disc. The arithmetic control part controls the printer 103 by using a program for producing a dyeing base body 1, the program having been stored in the memory part.

The dyeing base body 1 is a base material such as paper which is usable in the printer 103 and is applied (printed) with dyeing inks in a predetermined shape on one side (hereinafter, a "front surface"). Preferably, an opposite side (hereinafter, a "rear surface") of the dyeing base body 1 from the ink-applied surface (the front surface) is dark or black colored in order to increase heat absorption efficiency.

The dyeing inks are inks usable in the printer 103 and include at least three color inks, red (magenta), blue (cyan), and yellow. Each ink contains sublimable dyes (which are dissolved or fine-grained dispersed) capable of resisting heat during deposition and fixation (color development). The dyes are preferably dyes which will not cause dyeing irregularity after fixation, such as a quinophthalon sublimable dye or an anthraquinone sublimable dye.

A deposition device (a dye deposition device) 20 is configured to heat the dyeing base body 1 at a predetermined temperature under substantially a vacuum condition, thereby depositing the dyes onto a lens 10. The deposition device 20 is provided with an open/close door not shown, a lamp 21 serving as a heat source placed in an upper part of the inside of the device 20, a dyeing jig 200 placed in a lower part of the inside of the device 20, a rotary pump 22 for forming substantially the vacuum condition in the inside of the device 20, and a leak valve 23 for bringing (returning) pressure of the inside to atmospheric pressure. The lamp 21 in the present embodiment is a halogen lamp, but may be any type if only it can heat the dyeing base body 1 in noncontact relation.

Figure 2:
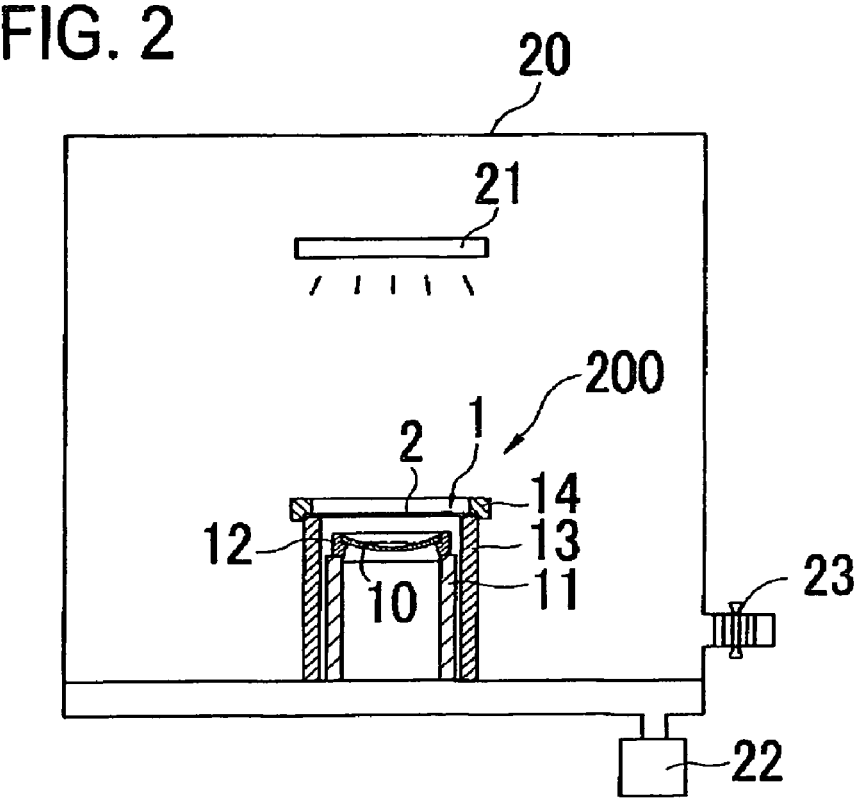
FIG. 2 is a schematic configuration view of a deposition device and a dyeing jig.

FIG. 2 is a schematic configuration view of the deposition device 20 and the dyeing jig 200. A cylindrical support member 11 on which the lens 10 is put is placed inside a cylindrical support member 13 on which the dyeing base body 1 is put. In the case where a rear refractive surface of the lens 10 is to be dyed, an outer edge of a front refractive surface of the lens 10 is supported on a cylindrical holder 12 placed on the support member 11. The dyeing base body 1 put on the support member 13 is fixedly retained with outer edges of the front and rear surfaces caught between the support member 13 and a retainer 14. In this state, the dyeing base body 1 is placed so that the ink-applied surface faces the surface of the lens 10 to be dyed in noncontact relation. According to the vapor deposition transfer dyeing method, if the distance between the dyeing base body 1 and the lens 10 is too short or too long, dye deposition is insufficient (nonuniform), which causes dyeing irregularity. Therefore, the vertical distance from the ink-applied surface of the dyeing base body 1 to a geometric center of the surface of the lens 10 to be dyed is preferably 5 mm to 30 mm, more preferably, 5 mm to 20 mm.

The lens 10 may be selected from any lenses made of a material such as polycarborate resin (e.g., diethylene glycol bisallyl carbonate polymer (CR-39)), polyurethane resin, allyl resin (e.g. allyl diglycol carbonate and its copolymer, diallyl phthalate and its copolymer), fumaric acid resin (e.g. benzyl fumarate copolymer), lo styrene resin, polymethyl acrylate resin, fibrous resin (e.g. cellulose propionate); and a high-refractive material such as thiourethane resin (MR-6 to 8), and thioepoxy resin (MR-174).

In an oven (a dye fixing device) 30, a heater 31 which irradiates infrared rays for heating the lens 10 is mounted to heat the dye-deposited lens 10 under atmospheric pressure at a predetermined temperature, thereby fixing the dyes on the lens 10 for color development. In this embodiment, the heater 31 is a heater having a radiation surface formed of a ceramic plate, configured to radiate infrared rays in one direction.

Figure 3:
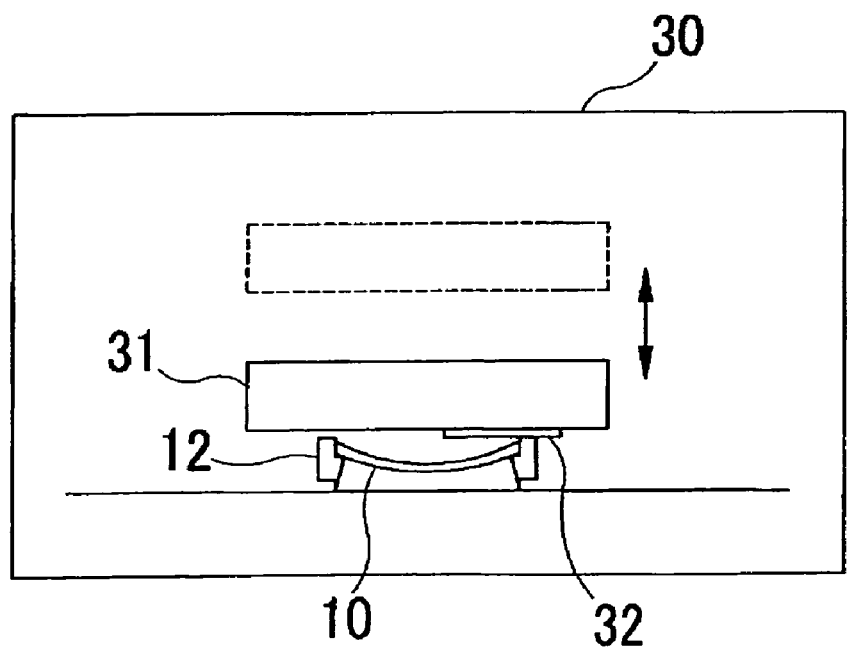
FIG. 3 is a schematic configuration view of an oven.

FIG. 3 is a schematic configuration view of the oven 30. The heater 31 is vertically movable by a vertical movement mechanism not shown and can be adjusted to a height (position) so as to be nearly contact with the holder 12 for heating operation. A shielding member 32 is a plate-shaped member resistant to heat and having a width larger than at least the diameter of the lens 10 (see FIG. 5A). This shielding member 32 is movable to be placed between the lens 10 put on the holder 12 and the heater 31. In this embodiment, the shielding member 32 is a thin aluminum plate whose underside is almost equal in height (position) to an upper surface of the holder 12 and is horizontally movably mounted in the oven 30. This shielding member 32 shields a partial region of the lens 10 to block the infrared rays traveling toward that region. The shielding member 32 does not have to completely block the infrared rays if only the region shielded by the shielding member 32 is not heated up to a temperature that causes the shielded region to turn yellow during heating by the heater 31. Further, when the surface of the lens 10 is to be entirely dyed, this shielding member 32 is unnecessary and removed from the position above the lens 10 As an alternative, the shielding member 32 may be provided in attachable/detachable manner inside the oven 30.

The following explanation will be given to a method of dyeing a lens according to a vapor deposition transfer dyeing method with use of the aforementioned dyeing system. Herein, the case of dyeing a lens in gradations is explained.

Upon start of the dyeing base body producing program on the computer 102, a dyeing base body producing screen appears on the monitor 101. By operation of the operation unit 104, a condition for gradation dyeing is set. The printer 103 then prints out the dyeing base body 1 for gradation dyeing as shown in FIG. 4. The outputted dyeing base body 1 has a circular dyed region including an area 2 comprised of an area 2a applied with inks (dyes) in dark or deep color and an area 2b applied with inks (dyes) in light or faint color, and an uncolored area 3 applied with no inks (dyes). The diameter of the dyed region is equal to or slightly larger than the diameter of the lens 10 to be dyed.

In FIG. 4, the area 2 (2a and 2b) applied with inks (dyes) is formed in two color density levels but is not limited thereto. The ink-applied area 2 whereby the lens 10 can be dyed in desired color density gradations has only to be formed on the dyeing base body 1 (see U.S. Pat. No. 6,520,999B1 (JP2001-59950A).

In the deposition device 20, the produced dyeing base body 1 and the lens 10 are placed facing each other in noncontact relation by use of the jig 200. The device 20 is hermetically closed and evacuated to substantially a vacuum (about 0.1 kPa to about 5 kPa) by the pump 22. It is to be noted that the vacuum may be less than 0.1 kPa, but it requires a high-performance exhauster. Further, as the internal pressure of the device 20 increases, the temperature required to sublimate the dyes becomes higher. Accordingly, the vacuum is preferably about 0.1 kPa to about 5 kPa and more preferably about 0.1 kPa to about 3 kPa.

When the internal pressure of the deposition device 20 becomes a predetermined vacuum, the lamp 21 is turned on to heat the dyeing base body 1 from above in noncontact relation. Accordingly, the dyes sublimate and evaporate from the ink-applied area 2 and is deposited on the surface of the lens 10 to be dyed. A heating time by the deposition device 20 (the lamp 21) is a time during which most of the dyes of the ink-applied area 2 can sublimate and evaporate Further, a heating temperature (a temperature on the dyeing base body 1) by the device 20 (the lamp 21) is preferably as high as possible which cannot cause deterioration of the dyes, deformation of the lens 10, and so on.

After completion of heating by the lamp 21, the lamp 21 is turned off, the valve 23 is opened, and the lens 10 is taken out as mounted on the holder 12 from the deposition device 20.

Successively, the lens 10 on which the dyes are deposited is heated in the oven 30 for a predetermined time to produce desired hue and color density. A heating temperature by the oven 30 (the heater 31) is preferably as high as possible which cannot cause deterioration of the dyes, deformation of the lens 10, and so on.

Figure 5A:
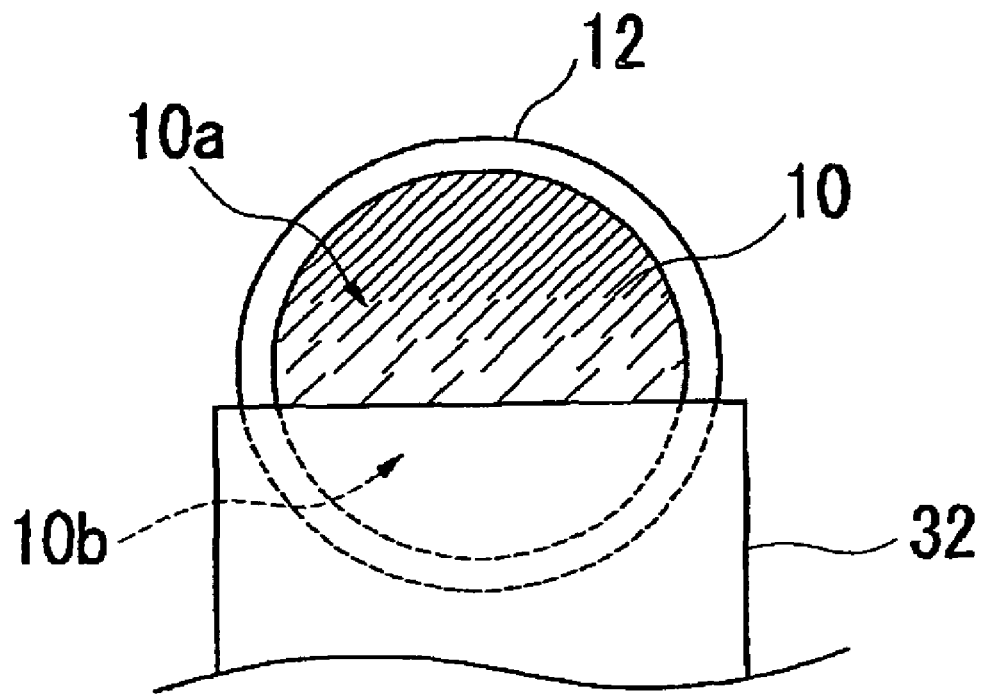
FIGS. 5A and 5B are views showing dyeing with use of a shielding member.

The holder 12 is put in the oven 30. The shielding member 32 is placed to shield a dye non-deposited area 10b of the lens 10 from above as shown in FIG. 5A. The heater 31 is moved downward as shown in FIG. 3 to come close to the holder 12 so as to sandwich the shielding member 32 against the holder 12. Since the shielding member 32 is a thin plate, the heater 31 moved down serves to shield a dye deposited area 10a of the lens 10 from above. This covering the dye deposited area 10a from above can restrain resublimation of the dyes in a fixing step and thus achieve desired hue and color density.

Figure 5B:
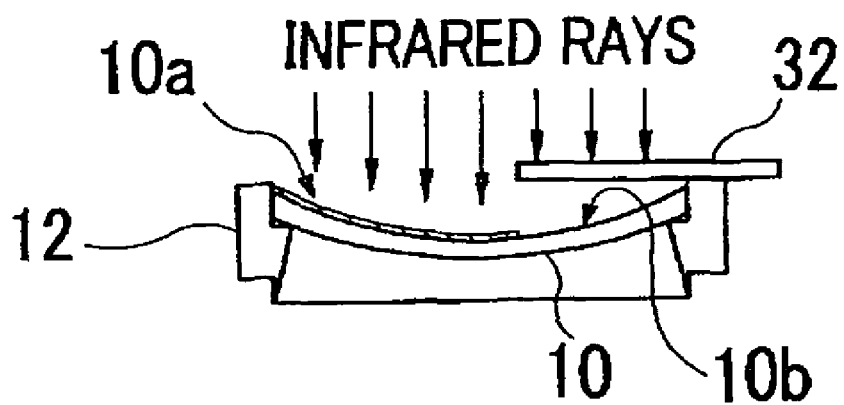

After setting the lens 10, the heater 31, and the shielding member 32 in place, the heater 31 is activated to irradiate the infrared rays to the lens 10. In this state, the heating temperature is about 70° C. to about 200° C. on the lens 10 and the heating time is about 10 minutes to about 3 hours. At this time, as shown in FIG. 5B, the dye deposited area 10a of the lens 10 is exposed to the infrared rays and the dye non-deposited area 10b of the lens 10 is protected by the shielding member 32 from irradiation of the infrared rays. Thus, the dye deposited area 10a is heated to a temperature required for fixing of the dyes while the dye non-deposited area 10b is kept at a low temperature and hence will not turn yellow. When heated, the dye deposited area 10a may sometimes turn slightly yellow; however, such discoloration is unnoticeable because that area 10a is colored. Further, a surface of the lens 10 to be deposited with dyes is heated from one direction, so that the degree of yellow discoloration of the lens 10 can be reduced as compared with the case of heating of the entire lens 10.

In this embodiment, the dyes are deposited on a concave surface of the lens 10. Alternatively, the dyes may be deposited on a convex surface or both surfaces of the lens 10.

Examples and Comparative examples are described below to show the degree of restraining yellow discoloration of the lens in the case of using the dyeing method and the dyeing apparatus in the embodiment.

EXAMPLE 1

Figure 6:
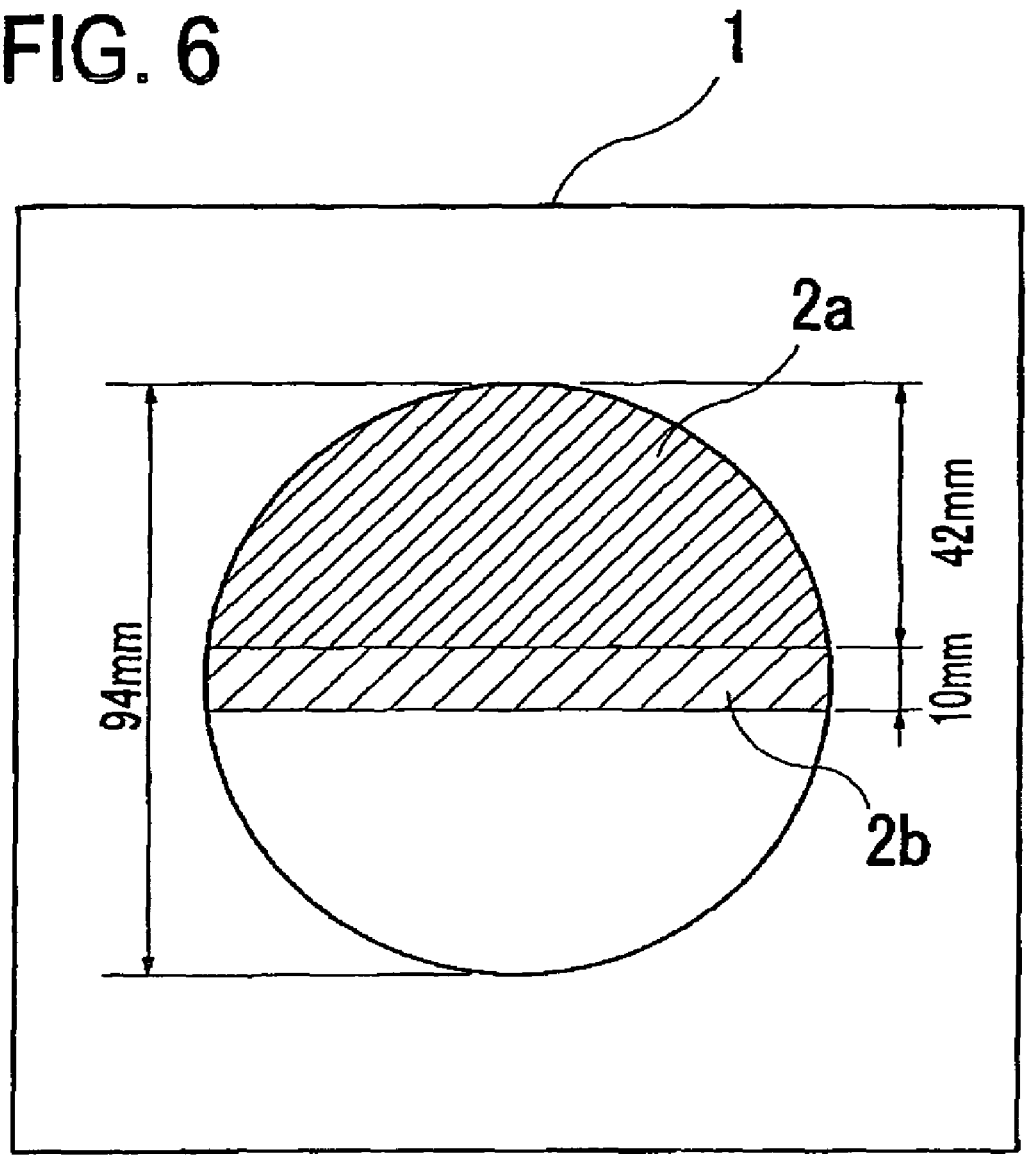
FIG. 6 is a view showing a dyeing base body used in examples and comparative examples.

A lens used in this example is a lens with a diameter of 75 mm and refractive power of 1.74 (Product name: HIE-1, made by Mitsui Chemicals, Inc.). A dyeing base body was produced in such a manner that inks containing sublimable dyes are applied on paper with a printer identical to the printer 103 in FIG. 1. At this time, as shown in FIG. 6, a dyed area on the dyeing base body was set as a circle having a diameter of 94 mm, including an ink (dye) applied area 2a extending by a distance of 42 mm from an edge of the dyed area to the center and an ink (dye) applied area 2b extending by a distance of 10 mm from a boundary with the area 2a. Further, a prescription value of the area 2a was set to provide dark gray consisting of Red: 430 dots (100% of maximum printer output corresponds to 1024 dots), Yellow: 150 dots, and Blue: 734 dots. A prescription value of the area 2b was set to provide light gray consisting of Red: 213 dots, Yellow: 75 dots, and Blue: 367 dots.

Subsequently, the dyeing base body and the lens were put in a deposition device identical to the deposition device 20 in FIG. 2. Under the condition that the degree of vacuum was 1 kPa and the temperature on the dyeing base body was about 230° C., a step of depositing the dyes onto the lens was conducted.

After the deposition step, the lens is put in an oven identical to the oven 30 shown in FIG. 3. A dye non-deposited area (hereinafter, referred to as a clear area) of the lens was shielded by a shielding member made of an aluminum plate and then a step of fixing the dyes on the lens was carried out under the condition that the heating temperature (the set temperature of the oven (heater)) was 240° C. and the heating time was 20 minutes.

After the dyeing (fixing), the lens had been dyed in gray gradations and the clear area did not turned yellow (by visual observation). The yellow discoloration degree (YI value) of the clear area was measured by a color measuring device (Product name: DOT-3, made by Murakami Color Research Laboratory Co., Ltd.). The measured YI value was 2.42. The YI value of the undyed lens made of the same material as above was measured for comparison. The measured YI value was 2.21.

EXAMPLE 2

With use of the same oven as in Example 1, the fixing step was carried out on a lens whose clear area was unshielded, under the same heating condition as in Example 1 including the heating temperature and the heating time. After dyeing (fixing), the lens had been dyed in gray gradations. The clear area had been slightly turned yellow. The measured YI value of the clear area was 2.88.

COMPARATIVE EXAMPLE 1

With use of an over (Product name: DKN612 made by Yamato Scientific Co., Ltd.) for heating an entire lens, the fixing step was carried out on a lens whose clear area was shielded by the same shielding member as in Example 1, under the same condition as in Example 1 excepting that the heating temperature was 160° C. and the heating time was 90 minutes. After the dyeing (fixing), the lens had been dyed in gray gradations. The clear area had been distinctly turned yellow. The measured YI value was 3.54.

COMPARATIVE EXAMPLE 2

With use of the same oven as in Comparative example 1, the fixing step was carried out on a lens whose clear area was unshielded, under the same heating condition as in Example 1 excepting that the heating temperature was 160° C. and the heating time was 90 minutes. After dyeing (fixing), the lens had been dyed in gray gradations. The clear area had been distinctly turned yellow. The measured YI value of the clear area was 3.62.

While the presently preferred embodiment of the present invention has been shown and described, it is to be understood that this disclosure is for the purpose of illustration and that various changes and modifications may be made without departing from the scope of the invention as set forth in the appended claims.

What is claimed is:

1. A method of dyeing a lens, the lens having a surface to be dyed, comprising the steps of (a) applying a dyeing ink containing a sublimable dye onto a base material to produce a dyeing base body for gradation dyeing, the dyeing base body having a surface with a first dyeing area applied with no ink and a second dyeing area applied with ink on the dyeing base body for substantially uniformly dyeing the entire lens surface;

(b) placing the dyeing base body for gradation dyeing produced in the step (a) and the lens so that the ink-applied surface of the dyeing base body and the surface of the lens to be dyed face each other in noncontact relation, and heating the dyeing base body under substantially a vacuum condition to sublimate the dye of the applied ink of the first dyeing area on the dyeing base body and deposit the sublimated dye on the lens surface, the lens surface on which the dye is deposited in the step (b) including a dye deposited area and a dye non-deposited area; and (c) heating the lens surface deposited with the dye in the step (b) by irradiation of an infrared ray from a heater to fix the deposited dye on the lens, wherein the dye non-deposited area is prevented from being irradiated with the infrared ray by a shielding member placed between the lens and the heater and in noncontact with the lens and the dye deposited area is irradiated with the infrared ray, and the lens is fixedly located with respect to the shielding member during heating in the step (c) so that the entire dye-deposited area of the lens surface is irradiated with the infrared ray, the dye non-deposited area of the lens surface being restrained from turning yellow due to heating in the step (c).

2. The dyeing method according to claim 1, wherein the fixing step (c) includes heating the dye-deposited area of the lens surface by the irradiation of the infrared ray from one direction.

* * * * *